United States Patent [19]
Gabel et al.

[11] 3,990,986
[45] Nov. 9, 1976

[54] COMPOSITION FOR THE CLARIFICATION AND DETACKIFICATION OF PAINT SPRAY BOOTH WASTES

[75] Inventors: Robert K. Gabel; Paul L. Seitz, both of Houston, Tex.

[73] Assignee: Nalco Chemical Company, Oak Brook, Ill.

[22] Filed: Dec. 19, 1974

[21] Appl. No.: 534,505

[52] U.S. Cl. .............................. 252/315; 210/54; 252/181; 252/DIG. 8
[51] Int. Cl.² ...................... B01J 13/00; C02B 1/20
[58] Field of Search ....... 252/315, 181, 548, DIG. 8

[56] References Cited
UNITED STATES PATENTS

| | | | |
|---|---|---|---|
| 2,354,146 | 7/1944 | Samuel | 252/181 X |
| 3,397,257 | 8/1968 | Brambilla et al. | 264/.5 |
| 3,671,447 | 6/1972 | Kowalski | 252/181 X |
| 3,684,720 | 8/1972 | Richardson | 252/181 X |
| 3,861,887 | 1/1975 | Forney | 55/19 |

*Primary Examiner*—Richard D. Lovering
*Attorney, Agent, or Firm*—John G. Premo; Robert A. Miller; Barry W. Sufrin

[57] ABSTRACT

Water used to wash the air in paint or lacquer spray booths in order to remove over-sprayed paint or lacquers is treated with a blend of a primary amino alcohol, a polyether polyamine and a water soluble salt of an amphoteric metal to reduce the tackiness of paint and lacquer solids and thereby reduce the tendency of over-sprayed paints and lacquers to adhere to walls, ceilings and floors of said spray booths and also to condition the paint and lacquer solids removed with the water so that they can be separated and the water recycled for further use in washing the air in the spray booth.

2 Claims, No Drawings

COMPOSITION FOR THE CLARIFICATION AND DETACKIFICATION OF PAINT SPRAY BOOTH WASTES

This invention involves a method for the clarification and detackification of paint spray booth wastes. In the application of paints and lacquers to automobile bodies and other types of articles it is customary to carry out such operations in enclosed spray booths and to introduce into such spray booths a curtain of water to wash the air and to remove over-sprayed paints or lacquer solids. The water containing suspended solids is filtered or otherwise treated to separate the solids so that the water can be recycled.

This process involves many problems. Thus, the paint and lacquer solids are normally tacky and tend to adhere to the walls, ceilings and floors of the spray booths which makes it necessary to shut down the operation from time to time in order to clean the spray booths. The deposits which are formed on the walls, ceilings and floors of the spray booths are also subject to the growth of anaerobic corrosive bacteria (e.g., desulfovibrio) which generates corrosive and highly objectionable hydrogen sulfide.

The paint and lacquer solids which are washed away and form suspensions in the water that is removed from the spray booths present a disposal problem. In order to avoid contamination of the environment it is customary to separate these solids from the water and to recirculate the water but these solids are difficult to separate by the usual method of filtration.

It is therefore desirable to control pollution and contamination in paint or lacquer spray booths so as to prevent, as much as possible, the deposition of paint and lacquer solids on walls, ceilings and floors and to condition the sludge which is removed with the water so that it can be readily filtered and the water which forms the filtrate can be returned for use in the process.

Many processes have been tried in efforts to remove this waste paint. One, merely lets the paint fall into the water, where it settles by gravity over a period of time from where it is eventually removed by dredging the sticky mass from the floor of the vessel in which is contained. This method has proved most unsatisfactory and as a result chemical treatments have been developed which will facilitate the cleaning of paint spray booth wastes from the water and which will furthermore provide a usable material for recycle, eliminating the trememdous waste of paint by overspray.

One of the chemical treatments which has proven most effective for the clarification and detackification of paint spray booth wastes involves the addition of a water soluble metallic salt, usually zinc chloride along with a polyelectrolyte which acts as a suspending agent. Upon the addition of this material to the aqueous paint spray booth wastes and subsequent modification of the waste water to a pH above about 8, zinc hydroxide a gellatinous material precipitates and coats the paint particles in suspension settling them and causing them to become detackified. This allows rapid cleanup of this settled material by skimmers, filters and the like. This zinc hydroxide coated paint may then be recovered by treatment with water at an acidic pH followed by dissolution in a solvent so as to recover the organic based paint.

A serious drawback to this process has been the need to adjust the pH of the paint spray booth wastes to above about 8 in order to enable this treatment to function. In order to do this, expensive equipment was needed to monitor the pH and add a suitable alkali into the system.

We have discovered that by blending a water-soluble metallic salt, the cation of which is able to form an insoluble hydroxide at pH values greater than about 7 with from 20–70% by weight of a primary amino alcohol and from 0–20% by weight of polyether polyamine and dissolving this composition in water, an effective water soluble composition for the clarification and detackification of paint spray booth wastes is formed which requires no addition of alkali when added to the paint spray booth wastes in order to cause flocculation of the paint contained in the water.

OBJECTS

An object of this invention is to provide to the art a new and useful composition for the clarification and detackification of paint spray booth wastes.

A further object of this invention is to provide to the art a composition for the clarification and detackification of paint spray booth wastes which contains a water soluble metallic salt, the metal being able to form an insoluble hydroxide at pH values greater than 7, a primary amino alcohol, and a polyether polyamine.

Another one of the objects of the present invention is to provide a new and improved process for controlling pollution and contamination in paint or lacquer spray booths in which the water used to wash the air in the spray booth and to remove over-sprayed paints or lacquers is conditioned by one or more additives which reduce the tackiness of paint and lacquer solids and thereby reduce the tendency of such solids to adhere to walls, ceilings and floors of paint and lacquer spray booths making it possible to operate such booths over a longer period of time before cleaning them which also reduces maintenance costs.

Another object of the invention is to provide a process of the type described in which paint and lacquer solids suspended in the water which is used to wash the air in spray booths are so conditioned that they can be recovered by filtration and the filtrate recycled in the process.

Another object of the invention is to provide a process of the type described characterized by deposit-corrosion control, longer booths runs, less maintenance, a more consistent effluent, lower plant treatment costs, lower microbiological activity, and the production of a sludge from the paint and lacquer solids which is more readily dewatered by filtration or otherwise than has been the case in conventional commercial operations. Other objects will appear hereinafter.

It is still a further object of this invention to provide to the art a process for the clarification and detackification of paint spray booth wastes which involves adding to an aqueous solution of paint spray booth wastes containing dispersed therein fine droplets of over-sprayed paint, a composition containing a water soluble metallic salt, said material being able to form an insoluble hydroxide at pH values greater than about 7; a primary amino alcohol; and a polyether polyamine.

DESCRIPTION OF THE INVENTION

The conventional paint or lacquer spray booth is a closed room where the object to be painted or lacquered is sprayed with paint or lacquer and the air is washed with a curtain or spray of water so as to remove over-sprayed paints or lacquers in the form of suspensions of paint or lacquer solids. These suspensions can be disposed of as waste materials but in order to avoid contamination of the environment, it is desirable to separate the solids and to reuse the water. Unfortunately, the paint or lacquer solids are quite tacky and despite air washing with water, they tend to build up in the form of deposits on the walls, ceilings and floors of the spray booths. In a typical operation a run might last for 2 weeks and at the end of that time the spray booth has to be emptied and cleaned. The cleaning might require 200 man hours. Furthermore, the sludge which is produced during the operation of the spray booth as a result of the combination of the water with the paint or lacquer solids is usually very difficult to de-water by the customary filation methods. In addition, the accumulation of the paint or lacquer deposits on the walls, ceilings and floors of the spray booths provides a suitable environment for anaerobic corrosive bacteria.

In the practice of the present invention it has been found that the addition of the blend of a primary amino alcohol, a polyether polyamine and a water soluble metallic salt capable of forming an insoluble hydroxide at pH values above 7 to the water used in washing the air, and in catching overspray in the spray booth reduces the tackiness of paint and lacquer solids, thereby reducing the tendency of over-sprayed paints and lacquers to adhere to walls, ceilings and floors of the spray booths and at the same time conditions the solids so that they can be readily removed from the water after the suspension of solids in water has been removed from the spray booths.

The separation of the solids from the water can be effected by vacuum filtration or in any other suitable manner and the filtrate can then be used over again in the process.

THE INVENTION

The compositions which we prefer to use in this invention for the clarification and detackification of paint spray booth wastes comprises:
A. From 10–60% by weight of a water soluble metallic salt, said metal being able to form an insoluble hydroxide at pH values greater than about 7;
B. From 20–70% by weight of a lower aliphatic amino alcohol;
C. From 0–20% by weight of a water soluble polyether polyamine; and
D. From 20–60% by weight water.

THE WATER SOLUBLE METALLIC SALTS

The water soluble metallic salts which are useful in the scope of this invention encompass all water soluble inorganic salts which will form floc-like hydroxide compounds at pH values greater than 7. While we prefer to use zinc chloride in the scope of this invention due to its high water solubility and the fact that the chlorine ion presents no pollution problem, other zinc salts can be used including zinc sulfate and zinc nitrate. Additionally, aluminum chloride, aluminum sulfate, ferric chloride, and ferric sulfate all give satisfactory results when used with this invention. It is understood that the above list does not encompass all metallic salts that will work in our invention and that other metal salts work in our invention and that other metal salts would be expected to prove satisfactory providing the particular cation will form an insoluble hydroxide at pH's greater than about 7 and that the anion in the salt will not cause pollution problems.

THE PRIMARY AMINO ALCOHOLS

The primary amino alcohols which are useful in this invention include monoethanolamine, mono isopropanolamine, mono propanolamine, mono isobutanolamine, 2-aminoethyl-2′-hydroxyethyl ether, 2-amino isopropyl-2′-hydroxyethyl ether, 2-aminoethyl-2′-hydroxypropyl ether, 2-amino isopropyl-2′-hydroxypropyl ether and higher polyether amino alcohols. These primary amino alcohols are generally well known and their synthesis need not be described here.

THE POLYETHER POLYAMINES

The polyether polyamines useful in this invention are synthetic products with a polyalkylene oxide base. The polyalkylene oxide base material usually has a molecular weight of from 100 to 1,000 and may furthermore be formed by the use of any lower alkylene oxides or mixtures thereof. These alkylene oxides include ethylene oxide, propylene oxide and butylene oxide.

For the use in our invention, we prefer to use a polyalkylene oxide which has a moderate molecular weight, usually varying from 250 to 750. Additionally, we prefer to use a polyalkylene oxide which has both ethylene and propylene oxide units contained in it. The ratio of ethylene oxide may vary from 90:10 to 10:90. Ideally, we prefer to use a polyalkylene oxide which has a ratio of ethylene oxide to propylene oxide units of about 50:50 to 90:10. While butylene oxide may be used, we prefer to avoid this material due to its limited solubility in water when formed into a polyether polyamine useful in our invention. It is understood that both polyethylene oxide and polypropylene oxide by themselves will provide a suitable base for the polyether polyamine.

The polyalkylene oxides are then reacted with a difunctional epoxide compound using a cationic catalyst at temperatures of 40°–110° C for ½ to 2 hours. The difunctional epoxide compound which we prefer to use is epichlorohydrin due to its reactive nature and its commercial availability. It should be understood that other difunctional epoxides useful in our invention may include epiiodohydrin, and epibromohydrin. Additionally, compounds which will provide a reactive hydroxyl group at the ends of the polyalkylene oxide chain and which furthermore will leave a reactive site such as a halogen on the molecule for further reaction with an amine are contemplated in our invention.

The cationic catalysts used to "cap" the polyalkylene oxide with the difunctional epoxide can be anyone of a number of well known catalysts or mixtures thereof. A preferred catalyst is boron trifluoride. The mole ratio of hydroxyl groups present on the polyoxyalkylene oxide to lower difunctional epoxide compound can vary from 0.5:1 to 1:0.5. Preferably, the mole ratio of hydroxyl groups on the polyoxyalkylene oxide to lower difunctional epoxide will be 1:1.

The polyether polyamines of this invention are then formed by reacting the capped polyalkylene oxide with a lower aliphatic amine having from 2 to 8 carbon atoms. Preferably, the amine should have two or more amino groups. Among the suitable amino compounds which can be used include butylene diamine, propylene diamine, pentylene diamine, hexamethylene diamine and other higher homologues in the same series.

Due to the availability and price of raw materials it is often advisable to employ as this amine crude materials such as bottoms from the distillation of hexamethylene diamine which contain hexamethylene diamine, hexamethylene triamine and other homologues. The reaction of the capped polyalkylene oxide with the amine having 2 to 8 carbon atoms is carried out at temperatures ranging from 90° to 140° C. In the preferred method of carrying out this reaction, the capped polyalkylene oxide is added to the amine compound incrementally or continuously so as to maintain the desired temperature. If the amine is added to the capped polyalkylene oxide, gellation of the final product can occur due to cross linking between the modified polyalkylene oxides.

We generally prefer to add the caped polyalkylene oxide to the amine in a molar ratio of from 1:5 to 1:1 based on the number of amino groups present in the amine compound and the number of halogens, or other reactive anions on the capped polyalkylene oxide.

This material may be further treated with a difunctional compound capable of cross linking the resultant material. Examples of materials which fall in this category include those containing two reactive halogen atoms which may react with the amine groups present on the modified polyoxyalkylene oxide such as ethylene dichloride, 1,4-dichloro butene-2, propylene dichloride, and ethylene dibromide. Other suitable cross linking agents include epihalohydrins and other compounds containing at least two functional groups which include trifunctional and tetrafunctional compounds which have at least two functional groups which are reactive with the amine or hydroxyl functionalities remaining on the amine modified capped polyoxyalkylene oxide.

The cross linking agent is usually added to the amine modified capped polyalkylene oxide in samll amounts varying from 0.1 to 1.6 moles of cross linking agent for each mole of amine functionality added in the previous step. The cross linking agent is added to the amine modified capped polyalkylene oxide (polyether polyamine) is added at temperatures of from 40° to 100° C for a short period of time usually 15 minutes to 1 hour in order to insure the reaction of the cross linking agent with the polyalkylene polyamine.

We have found it necessary to incorporate cross linking agents of the type discussed above into the polyether polyamines useful in our invention in order to insure activity in the clarification and detackification of paint spray booth wastes. While it is foreseen that if a cross linking reaction occurs between the amine and the capped polyalkylene oxide material this step would perhaps not be necessary, we prefer to build up the molecular weight by this step in order to insure reproducible activity.

It is important to remember, however, that the polyether polyamine formed above be water soluble. Thus, excess amounts of cross linking agents should be avoided. Also since the polyether polyamine tends to be very viscous at ordinary temperatures, the addition of water to this material as a dilutant is oftentimes necessary.

USE OF CLARIFIERS AND DETACKIFIERS

In order to form suitable clarifiers and detackifiers for paint spray booths in accordance with our invention one need only blend materials of the three classes outlined above. This blending operation may be done in any stirred vessel, and heating and cooling within the vessel is not required. One of the compounds useful in our invention, is the water soluble metallic salt, the cation of which is able to form a hydroxyl group of a pH greater than 7. This metallic salt is usually used as an aqueous solution ranging from the limit of solubility of the compound selected to as low as 10% by weight aqueous solution of the material.

To the metallic salt is then added a primary amino alcohol in sufficient quantity so that the alcohol constitutes 20–70% by weight of the total compound. These amino alcohols are liquids and are quite soluble in water. They need not be used as an aqueous solution, and in fact should be used in a concentrated form as possible. Also contemplated in the use of our invention in the use of from 0 to 20% by weight of the polyether polyamines discussed above based on the weight of the total compound. These compounds as described above are water soluble, and may be added neat, or as an aqueous solution to the primary amino alcohols and metallic salt.

The paint detackifiers above are preferably added to paint spray booth wastes continuously so as to keep the concentration of our compound in the waste stream at from 50 to 1,000 ppm. The amino alcohol, polyether polyamine and chloride ion present from the capping of the polyalkylene oxide, and from the cross linking step appear to act as ligands to stabilize the alkaline solution. This results in a stable material which will precipitate the metallic hydroxide upon contact with the waste water eliminating the addition of strong alkali to the waste in order to produce the same effect using compounds which are currently commercially available.

In order to better illustrate our invention the following examples are presented:

EXAMPLE I 44.3 parts of monoethanol amine was added to 55.7 parts of a 68.5% zinc chloride solution to produce a detackifier containing 38.2% zinc chloride.

EXAMPLE II

A capped polyether was prepared by reacting 1542 parts of a polyalkylene oxide having a molecular weight of 514 and containing ethylene and propylene oxide units in a ratio of 65:35 with 555 parts of epichlorohydrin using a small amount of $BF_3$ as a catalyst at a temperature of approximately 110° C for 2 hours.

280 parts of the above capped polyalkylene oxide was then reacted with 200 parts of a bottoms fraction from the distillation of hexamethylene diamine having a molecular weight of approximately 200 at a temperature of about 130° C. To this product was added 20.0 parts of 1,4-dichlorobutene-2 and the temperature was held at about 90° C for one-half hour. The resulting product was a water soluble cross linked polyether polyamine.

EXAMPLE III

A composition in accordance with our invention was prepared by blending together:
A. 38.0 parts of monoethanolamine
B. 52.0 parts of a 60% zinc chloride solution, and
C. 10.0 parts of the cross linked polyether polyamine of Example II.

EXAMPLE IV

To 500 cc of water was added 200 ppm of the composition of Example I. The mixture was agitated, at which time 0.5 cc of a solvent based enamel paint of the type used in the auto industry was added with agitation.

After a short period of time, agitation was stopped. The resultant "sludge" was not sticky to the touch, and after settling, the water when visually observed was clear.

EXAMPLE V

The same process as in Example IV was repeated using as the detackifier the composition of Example III. Similar results were obtained to those in Example IV.

It is important to note that no pH adjustment was necessary to detackify the paint in either Examples IV or V.

We claim:

1. A composition for the clarification and detackification of paint spray booth wastes which consists of:
   A. From 10–60% by weight of a water soluble metallic salt from the group consisting of zinc chloride, zinc sulfate, zinc nitrate, aluminum chloride, aluminum sulfate, ferric sulfate and ferric chloride;
   B. From 20 – 70% by weight of a lower aliphatic amino alcohol selected from the group consisting of monoethanolamine, monoisopropanolamine, monopropanolamine, and monoisobutanolamine;
   C. From 0 – 20% by weight of a water soluble polyether polyamine which has been prepared by the steps which comprise:
      i. Reacting a polyalkylene oxide, said alkylene oxide selected from the group consisting of ethylene oxide propylene oxide and butylene oxide with a lower difunctional epoxide selected from the group consisting of epichlorohydrin, epibromohydrin and epiiodohydrin in a mole ratio of hydroxyl groups present on said polyalkylene oxide to lower difunctional epoxide of from 0.5:1.0 to 1.0:0.5, said polyalkylene oxide further characterized as having a molecular weight of from 100 to 1,000 whereby a capped polyalkylene oxide is formed;
      ii. Reacting the capped polyalkylene oxide of step i with a lower aliphatic amine having from 2 to 8 carbon atoms and two or more amino groups in a mole ratio of from 1:5 to 1:1 based on the number of amino groups present on the amine compound and the number of halogens on the capped polyalkylene oxide; and then,
      iii. Recovering the polyether polyamine.
   D. From 20 to 60% by weight water.

2. A composition for the clarification and detackification of paint spray booth wastes which consists of:
   A. From 10 – 60% by weight of a water soluble metallic salt from the group consisting of zinc chloride, zinc sulfate, zinc nitrate, aluminum chloride, aluminum sulfate, ferric sulfate and ferric chloride;
   B. From 20 – 70% by weight of a lower aliphatic amino alcohol from the group consisting of monoethanolamine, monoisopropanolamine, monopropanolamine, and monoisobutanolamine;
   C. From 0 – 20% by weight of a water soluble polyether polyamine which has been prepared by the steps which comprise:
      i. Reacting a polyalkylene oxide, said alkylene oxide selected from the group consisting of ethylene oxide, propylene oxide and butylene oxide with a lower difunctional epoxide selected from the group consisting of epichlorohydrin, epibromohydrin and epiiodohydrin in a mole ratio of hydroxyl groups present on said polyalkylene oxide to lower difunctional epoxide of from 0.5:1.0 to 1.0:0.5, said polyalkylene oxide further characterized as having a molecular weight of from 100 to 1,000 whereby a capped polyalkylene oxide is formed;
      ii. Reacting the capped polyalkylene oxide of step i with a lower aliphatic amine having from 2 to 8 carbon atoms and two or more amino groups in a mole ratio of from 1:5 to 1:1 based on the number of amino groups present on the amine compound and the number of halogens on the capped polyalkylene oxide;
      iii. Reacting the polyether polyamine of step ii with a cross-linking agent, said cross-linking agent selected from the group consisting of ethylene dichloride, ethylene dibromide, 1, 4-dichloro 2-butene, propylene dichloride, and epihalohydrins in a mole ratio of cross-linking agent to amine functionality added in step ii above of from .1 to 1.6 whereby a cross-linked polyether polyamine is formed; and then,
      iv. Recovering the polyether polyamine;
   D. From 20 to 60% by weight water.

* * * * *